United States Patent
Mo et al.

(10) Patent No.: US 8,559,828 B2
(45) Date of Patent: Oct. 15, 2013

(54) FRAME FORMATTING FOR HIGH RATE OPTICAL COMMUNICATIONS

(75) Inventors: Fan Mo, Hinckley, OH (US); Sameep Dave, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 13/356,198

(22) Filed: Jan. 23, 2012

(65) Prior Publication Data

US 2012/0189322 A1 Jul. 26, 2012

Related U.S. Application Data

(60) Provisional application No. 61/435,278, filed on Jan. 22, 2011, provisional application No. 61/521,263, filed on Aug. 8, 2011.

(51) Int. Cl.
*H04B 10/00* (2013.01)
*H04B 10/50* (2013.01)

(52) U.S. Cl.
CPC ............................. *H04B 10/505* (2013.01)
USPC .......................................... 398/183; 398/192

(58) Field of Classification Search
USPC ................... 398/74, 154, 158, 183, 188, 192
See application file for complete search history.

(56) References Cited

U.S. PATENT DOCUMENTS

| | | | |
|---|---|---|---|
| 4,451,916 A * | 5/1984 | Casper et al. ................. | 714/4.3 |
| 6,323,787 B1 * | 11/2001 | Yamashita ..................... | 341/58 |
| 6,614,950 B2 * | 9/2003 | Huang et al. .................. | 385/15 |
| 7,251,256 B1 | 7/2007 | Barry et al. | |
| 7,266,310 B1 | 9/2007 | Savory et al. | |
| 2004/0184487 A1 | 9/2004 | Kim | |
| 2004/0223767 A1 | 11/2004 | Pappalardo et al. | |
| 2006/0013590 A1 | 1/2006 | Hueda et al. | |
| 2007/0065078 A1 | 3/2007 | Jiang | |
| 2007/0217792 A1 | 9/2007 | Nonaka et al. | |
| 2010/0209121 A1 | 8/2010 | Tanimura | |
| 2010/0232809 A1 | 9/2010 | Cai et al. | |
| 2010/0239264 A1 | 9/2010 | Yang et al. | |
| 2010/0329677 A1 | 12/2010 | Kaneda et al. | |
| 2011/0064421 A1 | 3/2011 | Zhang et al. | |
| 2012/0177365 A1 * | 7/2012 | Winzer ........................... | 398/26 |

FOREIGN PATENT DOCUMENTS

EP 2352239 A1 8/2011

OTHER PUBLICATIONS

International Search Report and Written Opinion dated Aug. 30, 2012, PCT/US2012/022231 to ViaSat, Inc. et al., 8 pgs.
International Search Report and Written Opinion dated Aug. 30, 2012, PCT/US2012/022234 to ViaSat, Inc. et al., 10 pgs.
Non-final Office Action dated Dec. 28, 2012, U.S. Appl. No. 13/205,431 to Mo et al., 12 pgs.

* cited by examiner

*Primary Examiner* — Dalzid Singh
(74) *Attorney, Agent, or Firm* — Holland & Hart LLP

(57) ABSTRACT

Methods, systems, and devices are described for formatting of data streams to be transmitted over fiber optic channels, and for processing received optical signals. A data transmission device may include a digital coding and modulation module that encodes a digital data stream, inserts unique words into the digital data stream, and modulates the encoded data stream and unique words onto optical channels for transmission over an optical fiber. A demodulation and decoding device may include a unique word identification module that identifies the unique words inserted in each optical channel stream, determines one or more characteristics of the plurality of optical channels based on the unique words, and provides the one or more characteristics to one or more other modules in the demodulator and decoding device.

25 Claims, 14 Drawing Sheets

FRAME FORMATTING FOR HIGH RATE OPTICAL COMMUNICATIONS

CROSS REFERENCES

The present application claims the benefit of U.S. Provisional Patent Application No. 61/435,278, filed on Jan. 22, 2011, entitled "HIGH RATE OPTICAL COMMUNICATION," and U.S. Provisional Patent Application No. 61/521, 263, filed on Aug. 8, 2011, entitled "FRAME FORMATTING FOR HIGH RATE OPTICAL COMMUNICATIONS," both of which are incorporated herein by reference in their entirety.

BACKGROUND

The present disclosure relates to systems, devices, and methods for formatting of data streams to be transmitted over fiber optic channels, and for processing received optical signals.

Fiber optic channels in network communications systems are widely deployed and are considered effective for data transmission, allowing relatively high bandwidth data communication. Optical fiber is typically flexible and can be bundled in cables. It is often used for long-distance communications because light propagates through the fiber with little attenuation compared to electrical cables. Typical present day commercial optical fiber systems transmit data at 10 or 40 Gbps. Each fiber can carry multiple independent channels, each using a different wavelength of light in a technique known as wavelength-division multiplexing (WDM).

Increased data transmission rates would be desirable as demand for bandwidth increases. However, in fiber optic systems, as data rates increase various optical phenomena begin to manifest and act to limit data transmission rates. For example, optical effects from chromatic dispersion (CD), polarization mode dispersion (PMD), and polarization dependent loss (PDL) begin to have a significant impact on the data transmission rate.

SUMMARY

Methods, systems, devices, and computer program products are described for formatting of data streams to be transmitted over fiber optic channels, and for processing received optical signals. A data transmission device may include a digital coding and modulation module that encodes a digital data stream, inserts unique words into the digital data stream, and modulates the encoded data stream and unique words onto a plurality of optical channels for transmission over an optical fiber. A demodulator and decoding device may include a unique word identification module that identifies the unique words inserted in each optical channel stream, determines one or more characteristics of the plurality of optical channels based on the unique words, and provides the one or more characteristics to one or more other modules in the demodulator and decoding device. Other functionality may be implemented, as described in more detail below.

In one set of embodiments, a digital coding and modulation apparatus includes: a data transport layer framer module, a coding module, coupled with the data transport layer framer module, a unique word insertion module coupled with the coding module, and an optical transmission module coupled with the unique word insertion module. The data transport layer framer module may be configured to receive an incoming data stream and format the data stream into data transport frames, and the coding module may be configured to encode error correction information into the data transport frames. The unique word insertion module may be configured to insert a plurality of unique words into a data stream including the data transport frames, each of the plurality of unique words corresponding to a different optical communication channel. The optical transmission module may be configured to modulate the data transport frames and unique words onto a plurality of optical communications channels and transmit the plurality of optical communications channels over an optical fiber, each of the plurality of unique words being modulated onto an associated optical communications channel. In some embodiments, the apparatus also includes a differential encoding module coupled between the unique word insertion module and the optical transmission module and configured to differentially encode data transport frames and unique words. The apparatus may also include, in some embodiments, a differential encoding module coupled between the coding module and unique word insertion module and configured to differentially encode data transport frames.

In some embodiments, the optical transmission module is configured to transmit dual-polarity QPSK optical signals over an optical fiber. The plurality of optical communications channels may include, for example, a horizontal in-phase (HI) channel, a vertical in-phase (VI) channel, a horizontal quadrature (HQ) channel, and a vertical quadrature (VQ) channel, and a first unique word of the plurality of unique words corresponds to the HI channel, a second unique word of the plurality of unique words corresponds to the VI channel, a third unique word of the plurality of unique words corresponds to the HQ channel, and a fourth unique word of the plurality of unique words corresponds to the VQ channel. The unique word insertion module may insert data bits corresponding to the unique words into the data stream based on a modulation scheme of the optical transmission module. Each unique word may include a PN code that corresponds to the optical communications channel associated with the unique word.

In other embodiments, a digital decoding and demodulation apparatus is provided that includes an optical interface module, a unique word identification module coupled with the optical interface module, and a demodulator module coupled with the unique word module. The optical interface module may be configured to receive a plurality of optical signals on a plurality of optical channels from an optical fiber and output a digitized version of each optical signal. The unique word identification module may be configured to identify a unique word in each of the plurality of optical signals. The demodulator module may be configured to: receive the digitized version of the optical signals and demodulate the optical signals into data transport frames using characteristics of the optical signals determined using the identified unique words, the one or more characteristics comprising an identification of one or more of the plurality of data streams and timing information between one or more of the plurality of data streams. The apparatus may also include a decoder module coupled with the demodulator module and configured to perform error correction on the data transport frames, and a data transport layer de-framer module coupled with the decoder module and configured to receive error corrected data transport frames and output a de-framed data stream.

The demodulator may, in some embodiments, include a differential decoding module configured to differentially decode data transport frames and unique words. The differential decoding module may be coupled between the optical interface module and the unique word identification module and configured to differentially decode the digitized version of each optical signal. In some embodiments, the optical interface module is configured to receive dual-polarity QPSK optical signals over an optical fiber. The unique word identification may identify unique words in each of a horizontal in-phase (HI), vertical in-phase (VI), horizontal quadrature (HQ) and vertical quadrature (VQ) channel. The demodulator may, for example, use at least a phase offset determined based on the timing information of the received unique words to track and correct phase for each of the HI, VI, HQ, and VQ channels. The unique word in each of the plurality of optical signals may include, for example, a PN code that corresponds to the associated optical signal.

A method for transmitting an encoded bit stream is provided in other embodiments includes receiving an incoming encoded bit stream that is to be transmitted over a plurality of optical channels in an optical fiber communication system, inserting a unique word into the bit stream for each optical channel onto which the encoded bit stream is to be transmitted, each optical channel corresponding to a different unique word, and transmitting the encoded bit stream and unique words over the plurality of optical channels. The method may further include differentially encoding the encoded bit stream. The transmitting the encoded bit stream may include, for example, transmitting dual-polarity QPSK optical signals over an optical fiber. In some embodiments, the plurality of optical communications channels comprise a HI, a VI channel, a HQ channel, and a VQ channel, and a first unique word of the plurality of unique words corresponds to the HI channel, a second unique word of the plurality of unique words corresponds to the VI channel, a third unique word of the plurality of unique words corresponds to the HQ channel, and a fourth unique word of the plurality of unique words corresponds to the VQ channel. In some embodiments, the inserting a unique word includes inserting data bits corresponding to the unique words into the encoded bit stream based on a modulation scheme used for the transmitting of the encoded bit stream. The unique word for each optical channel may include a PN code that corresponds to the optical channel.

A method for demodulating a data stream is provided in some embodiments, the method including receiving a digitized version of a plurality of optical signals received from an optical fiber communication system, the digitized version of the plurality of optical signals including a plurality of data streams corresponding to the plurality of optical signals, identifying a unique word in each of the data streams, determining one or more characteristics of the data streams based on the identification of the unique words, the one or more characteristics comprising an identification of one or more of the plurality of data streams and timing information between one or more of the plurality of data streams, and demodulating the data streams into data transport frames using characteristics of the optical signals determined using the identified unique words. The method may also include differentially decoding the encoded bit stream. In some embodiments, the receiving a digitized version of a plurality of optical signals may include receiving dual-polarity QPSK optical signals over an optical fiber. The plurality of data streams may include a HI stream, a VI stream, a HQ stream, and a vertical quadrature VQ stream. The unique word for each data stream may include, for example, a PN code that corresponds to the data stream.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, devices, and computer program products are described for formatting of data streams to be transmitted over fiber optic channels, and for processing received optical signals. A data transmission device is described which may include a digital coding and modulation module that encodes a digital data stream, inserts unique words into the digital data stream, and modulates the encoded data stream and unique words onto a number of optical channels for transmission over an optical fiber. A different unique word (or set of unique words) may be mapped to each optical channel. A demodulation and decoding device is described which may include a unique word identification module that identifies the unique words inserted in each optical channel stream, determines one or more characteristics of each of the of optical channels based on the unique words, and provides the one or more characteristics to one or more other modules in the demodulation and decoding device. Additional functionality may be implemented, as described in more detail below.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
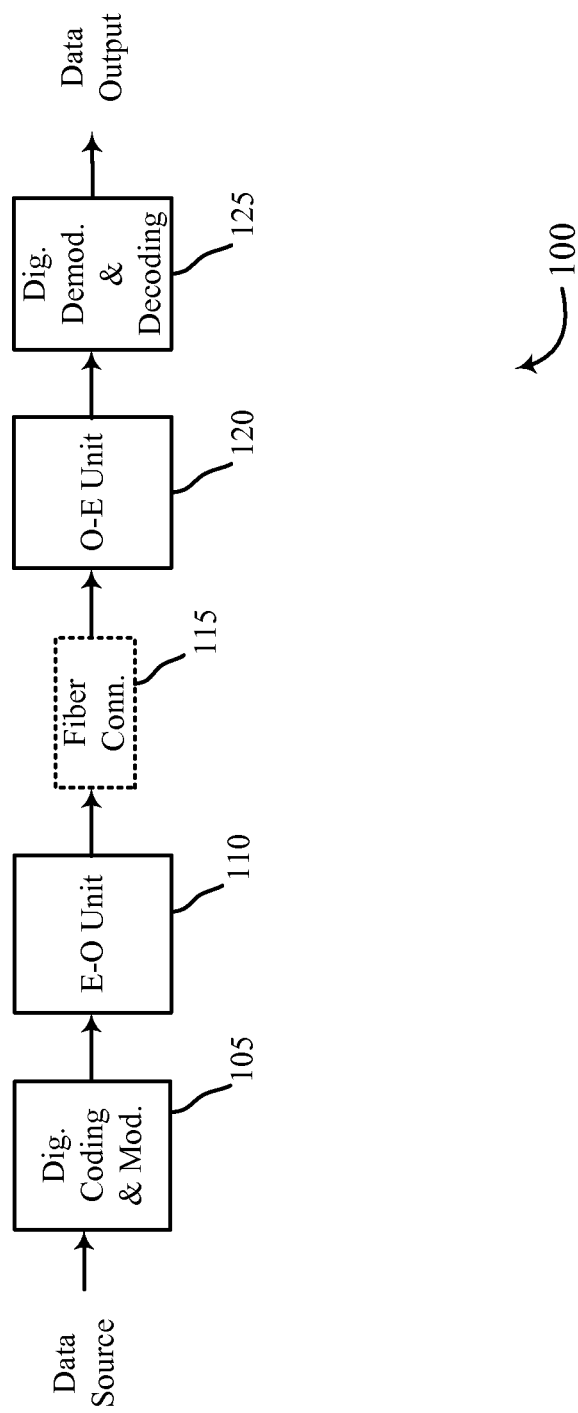
FIG. 1 is a block diagram of an optical communication system including components configured according to various embodiments of the invention.

Systems, devices, methods, and software are described for an optical communication system that utilizes fiber optic optical cables as a data transmission medium. An example of an optical data transport system 100 is illustrated in FIG. 1. In this embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. The digital coding and modulation unit 105 receives this data, and performs framing, forward error correction coding, and modulation functions on the data. In various embodiments, the digital coding and modulation unit 105 inserts a unique word into the data stream for each optical channel over which data will be sent. The electrical-to-optical (E-O) unit 110 transforms the data and inserted unique words into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain. The digital demodulation and decoding unit 120 receives the digitized version of the optical signal and detects the unique words that are inserted onto each optical channel. The detection of the unique words on each channel can be used to provide characteristics of the optical channels that may be used to the digital demodulation and decoding unit 120 when performing demodulation, forward error correction decoding, and de-framing functions on the data from the optical signal. The digital demodulation and decoding unit 120 may then output the data (e.g., to a user telecommunications device, a cable operator head-end unit, a telecommunications provider central office, a computer server, or a network attached storage system).

Figure 2:
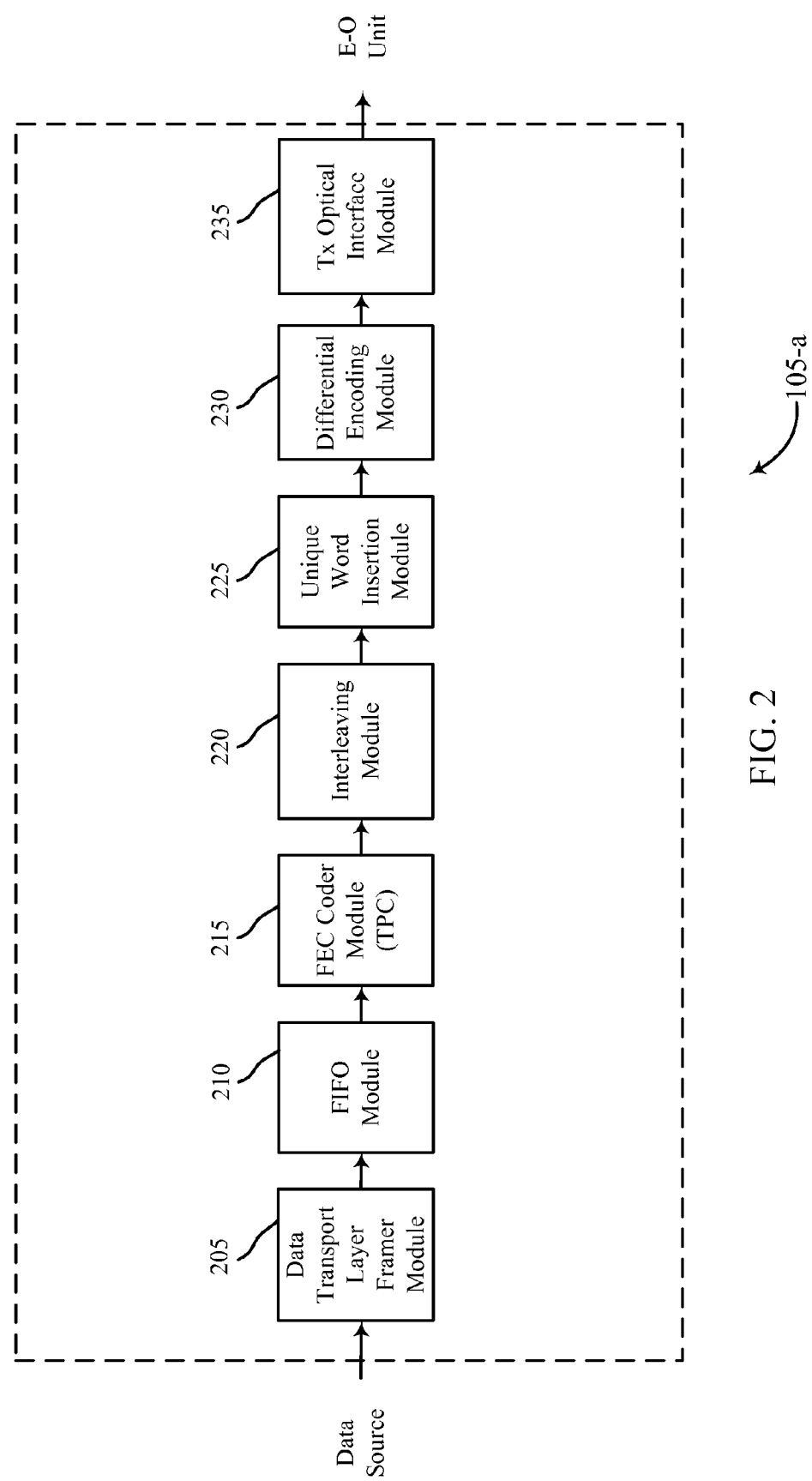
FIG. 2 is a block diagram of a digital coding and modulation unit according to various embodiments of the invention.

FIG. 2 illustrates a digital coding and modulation unit 105-a. In the illustrated embodiment, the digital coding and modulation unit 105-a includes a data transport layer framer module 205, a FIFO module 210, an FEC coder module 215, an interleaving module 220, a unique word insertion module 225, a differential encoding module 230, and a transmitter optical interface module 235. The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. The FIFO module 210 queues the packet frames received from the data transport layer framer module 205. The FEC coder module 215 calculates and adds forward error correction (FEC) information to the frames of data received from the data transport layer framer module 205. The particular type of FEC information of various embodiments generally includes systematically generated redundant error-correcting code (ECC) data that is transmitted along with the frames, and in an embodiment FEC information includes turbo product code (TPC) information. Interleaving module 220, in the embodiment of FIG. 2, receives the FEC information and frames of data, and interleaves the FEC information with the frames of data to reduce the likelihood of a channel error removing all FEC data for a particular frame.

Unique word insertion module 225, in the embodiment of FIG. 2, inserts unique words into the data stream received from the interleaving module 220. Unique words may be added to each transmitted optical channel to assist with the decoding and demodulation of the optical signals containing different streams of data. In one embodiment, the interleaved frames of data are modulated using dual-polarity (dual-pole) quadrature-phase-shift-keying (QPSK), resulting in four optical channels. The unique word insertion module 225 of this embodiment inserts a unique word into the data stream for each of the four optical channels. The inserted unique word is a different unique word for each optical channel, that is inserted into the data stream for the optical channel periodically. The unique words for each optical channel, according to some embodiments, are selected to have bit patterns that provide correlation properties that allow enhanced detection of the unique words in the received data stream. Each unique word may have a bit length based on expected channel characteristics, such as OSNR and phase noise, and target performance. Unituq words may also be periodically inserted into the data streams based on the channel characteristics and target performance. In various embodiments, unique words have a length of between 128 to 256 bits, or 32 to 64 symbols, and are inserted into the data streams once every 2,000 to 10,000 symbols.

Differential encoding module 230 provides differential encoding for the interleaved FEC encoded frames and unique words. Differential encoding is a well known technique in which data to be transmitted depend not only on the current bit (or symbol), but also on the previous one, such as through an exclusive OR function. The differentially encoded data is then provided to the transmitter optical interface module 235. The transmitter optical interface module 235 may forward the modulated data to the E-O module (FIG. 1) where it may be transmitted in the optical domain via dual-pole QPSK modulation, resulting in four parallel optical streams. Other modulation schemes may be used in other examples, as well.

Figure 3:
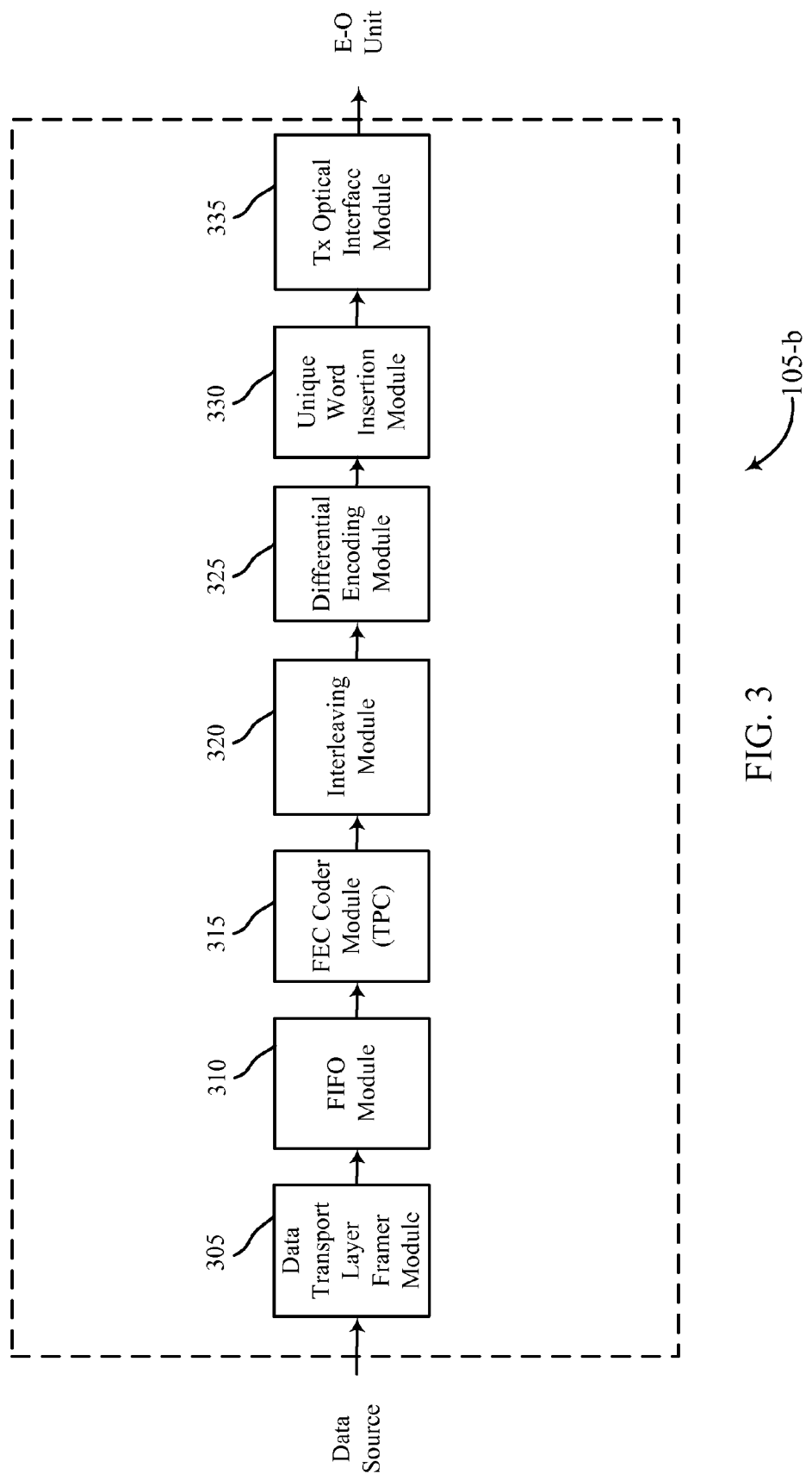
FIG. 3 is a block diagram of an alternate digital coding and modulation unit according to various embodiments of the invention.

As will be readily understood by one of skill in the art, the particular arrangement of the modules of FIG. 2 is an example, and the particular order in which data is processed may vary, and particular functions of various modules may be modified and/or combined. An example of an alternative configuration of a digital coding and modulation unit 105-*b* is illustrated in FIG. 3. In this embodiment, the digital coding and modulation unit 105-*b* includes the modules as described with respect to digital coding and modulation unit 105-*a* of FIG. 2, arranged in an alternate order. In the example of FIG. 3, the digital coding and modulation unit 105-*b* includes a data transport layer framer module 305, a FIFO module 310, an FEC coder module 315, an interleaving module 320, a differential encoding module 325, a unique word insertion module 330, and a transmitter optical interface module 335. In this particular example, differential encoding module 325 receives data from interleaving module 320. Differential encoding module 325 provides differential encoding for the interleaved FEC encoded frames, which is then provided to unique word insertion module 330. Unique word insertion module 330, in the embodiment of FIG. 3, inserts unique words into the differentially encoded data stream received from the differential encoding module 325. Similarly as discussed with respect to FIG. 2, unique words may be added to each transmitted optical channel to assist with the decoding and demodulation of the optical signals containing different streams of data. In one embodiment, the interleaved frames of data are modulated using dual-pole QPSK, resulting in four optical channels, and the unique word insertion module 330 inserts a unique word into the data stream for each of the four optical channels, and provide the data stream to the transmitter optical interface module 335. In the embodiment of FIG. 3, the transmitter optical interface module 335 modulates the data onto a number of optical channels and forwards the modulated data to the E-O module (FIG. 1) where it may be transmitted in the optical domain via dual-pole QPSK modulation, resulting in four parallel optical streams. Other modulation schemes may be used in other examples, as well.

Figure 4:
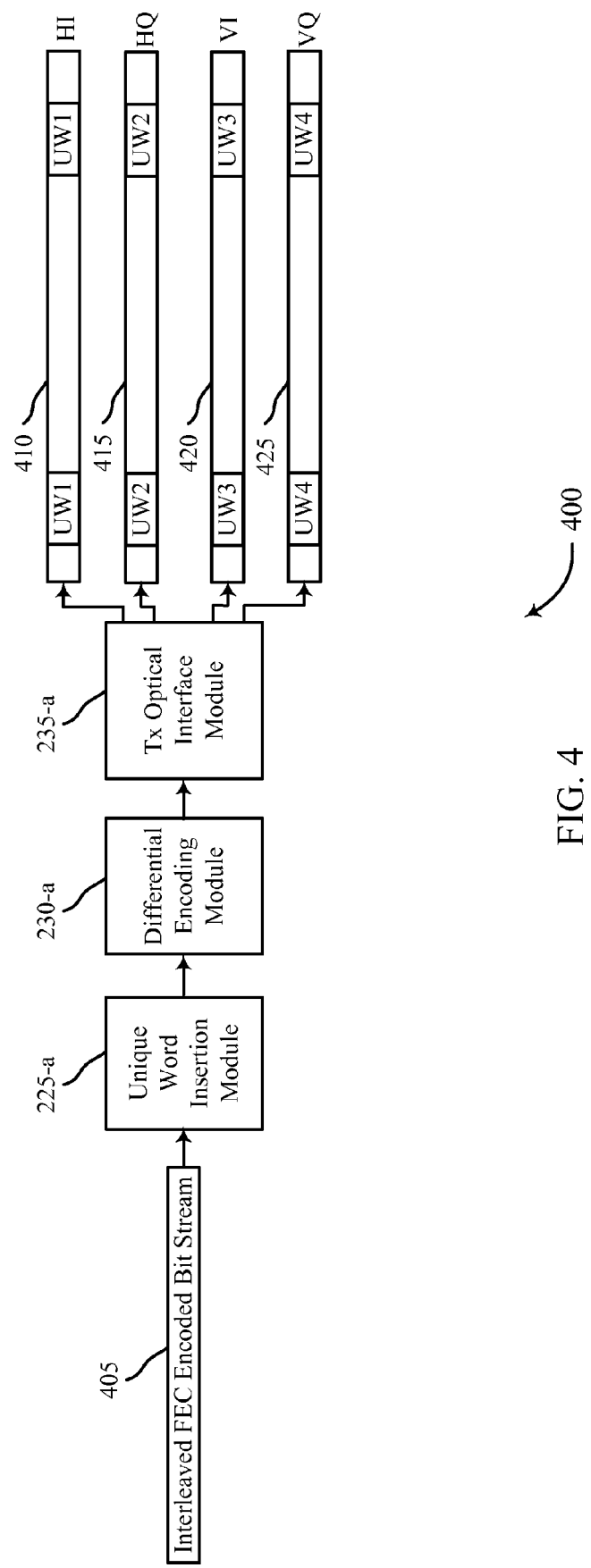
FIG. 4 is a block diagram of incoming and outgoing streams from a unique word insertion module, differential encoding module, and associated transmission optical interface module according to various embodiments of the invention.

The unique word insertion module 225 of FIG. 2, as briefly discussed, inserts a unique word into each data stream corresponding to each transmitted optical channel. It is noted that unique word insertion module 330 of FIG. 3 operates in a similar manner, and various aspects of the unique word insertion module 225 will be described in more detail with the understanding that such discussion applies equally to unique word insertion module 330. With reference now to FIG. 4, an illustration of incoming and outgoing data streams 400 of unique word insertion module 225-*a*, differential encoding module 230-*a*, and transmitter optical interface module 235-*a*, is described. In this example, an interleaved FEC encoded bit (or symbol) stream 405 is received at unique word insertion module 225-*a*. Similarly as described above, unique word insertion module 225-*a* inserts unique words into the stream 405, and provides the stream and unique words to differential encoding module 230-*a*, which provides a differentially encoded stream to transmitter optical interface module 235-*a*. The transmitter optical interface module 235-*a* may modulate the incoming data stream onto different optical channels according to various modulation techniques. In one example, the incoming data stream is modulated using dual-pole QPSK onto four different optical channels, namely a horizontal in-phase (HI) channel, a horizontal quadrature (HQ) channel, vertical in-phase (VI) channel, and a vertical quadrature (VQ) channel. Data transmitted on each of the optical channels may be selected, for example, by taking a first received bit (or symbol) and modulating it onto the HI channel, taking the second received bit and modulating it onto the HQ channel, and so on. In such an embodiment, the unique word insertion module 225-*a* inserts unique word bits into the data stream periodically to produce output data streams for each channel that have periodic unique words embedded therein. The output from the transmitter optical interface module 235-*a* thus provides an HI data stream 410 that has a first unique word periodically included therein, an HQ data stream 415 that has a second unique word periodically included therein, a VI data stream 420 that has a third unique word periodically included therein, and a VQ data stream 425 that has a fourth unique word periodically included therein. Each of the first, second, third, and fourth unique words are selected to uniquely identify the particular data stream associated with the unique word. When the transmitted optical signals are received at a receiver, these unique words may be identified and assist with compensation and demodulation of received optical signals. In one embodiment, the unique words include pseudonoise (PN) code generated for the unique word in each data stream 410 through 425.

Figure 5:
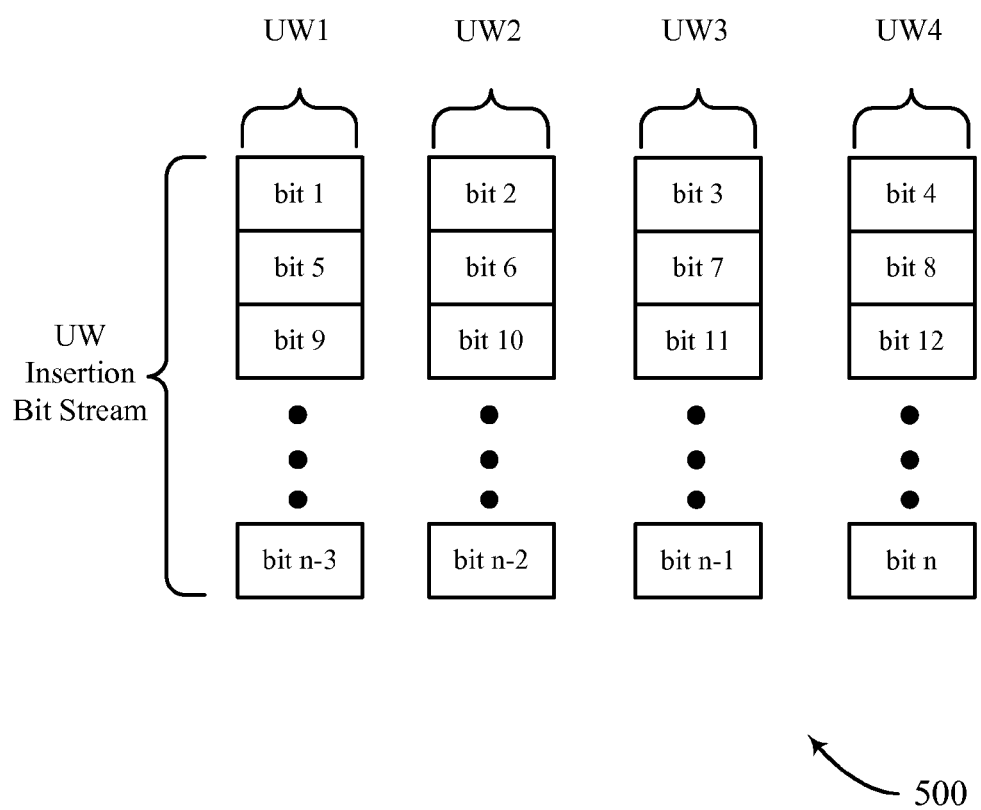
FIG. 5 is a illustration of a bit stream used to insert unique words into dual-polarity QPSK channels block diagram of a digital coding and modulation unit according to various embodiments of the invention.

The unique word insertion module 225-*a* inserts bits of data into the incoming interleaved FEC encoded bit stream 405 such that data streams 410 through 425 each include the correct corresponding unique word. As mentioned, the transmitter optical interface module 235-*a* may modulate consecutively received bits onto separate HI, HQ, VI, and VQ data streams. In such a case, the unique word insertion module 225-*a* inserts a bit stream into the interleaved FEC encoded bit stream 405 in which each fourth bit corresponds to a particular unique word. An example of such a unique word insertion bit stream 500 is illustrated in FIG. 5. In this example, each unique word is n/4 bits in length, resulting in unique word insertion bit stream 500 that is n bits. These n bits are periodically inserted into the incoming interleaved FEC encoded bit stream 405 according to a predetermined interval, with bits 1, 5, 9, and so on through bit n−3 corresponding to the first unique word (UW1) of HI data stream 410. Likewise, bits 2, 6, 10, and so on through bit n−2 correspond to the second unique word (UW2) of HQ data stream 415; bits 3, 7, 11, and so on through bit n−1 correspond to the third unique word (UW3) of VI data stream 420; and bits 4, 8, 12, and so on through bit n correspond to the fourth unique word (UW4) of VQ data stream 425. Of course, other modulation techniques may be used in which data is modulated onto optical channels according to different sequences, and the unique word insertion module 225-*a* provides the unique word insertion bit stream accordingly so as to provide each optical channel with a corresponding unique word.

Figure 6:
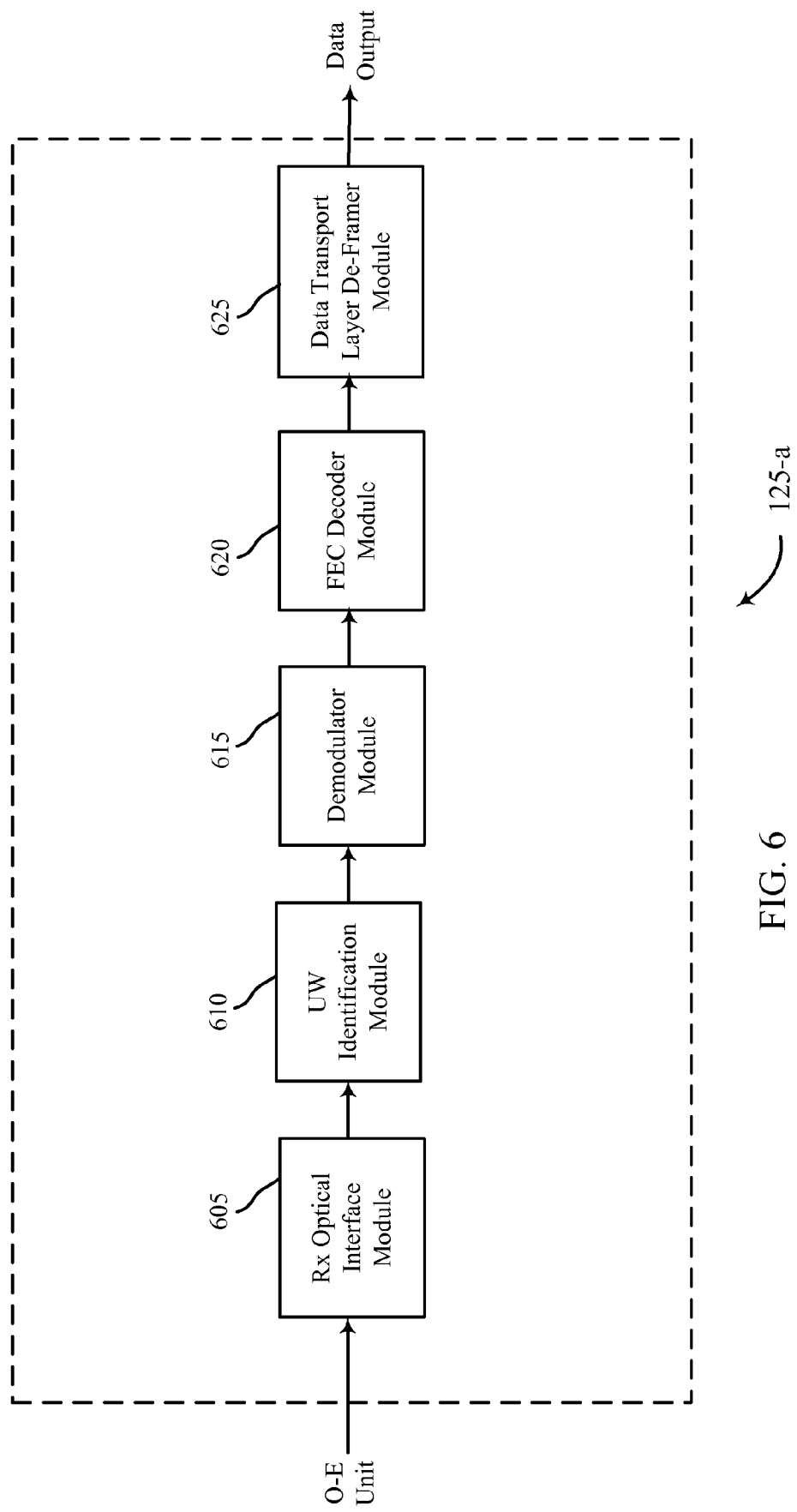
FIG. 6 is a block diagram of a digital demodulation and decoding unit according to various embodiments of the invention.

As illustrated in FIG. 6, a digital demodulation and decoding unit 125-*a* may include a number of modules. In this embodiment the digital demodulation and decoding unit 125-*a* includes a receiver optical interface module 605, a unique word identification module 610, demodulator module 615, an FEC decoder module 620, and a data transport layer de-framer module 625. The receiver optical interface 605 is the interface from the O-E unit 120. The receiver optical interface module 605 provides electrical signals to a unique word identification module 610 that identifies the unique words that are inserted in each of the optical channel data streams. The unique word identification module 610 removes the unique words from each respective data stream, and determines information related to the received data streams that may be derived from the unique word identification, such as the particular received channel on which the unique words are identified, and the timing of the receipt of the unique words.

This information may be provided to other modules for assistance in the demodulating and/or decoding of the received optical channels. The electrical signals, are provided from the unique word identification module 610 to demodulator module 615. Demodulator module 615 may include a differential decoding module that decodes differential encoding that may have been performed at digital coding and modulation module 105. Various embodiments of the demodulator module 615 will be discussed in further detail below. The information from the demodulator module 615 is provided to FEC decoder module 620 which decodes and may correct transmission errors identified from error-correcting code. The FEC decoder module 620 provides decoded data to the data transport layer de-framer module 625, which de-frames the data from the signal according to the particular protocol used in the optical transmission, and provides output data. The data output may be, for example, a user or any receiving system.

These components of may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 7:
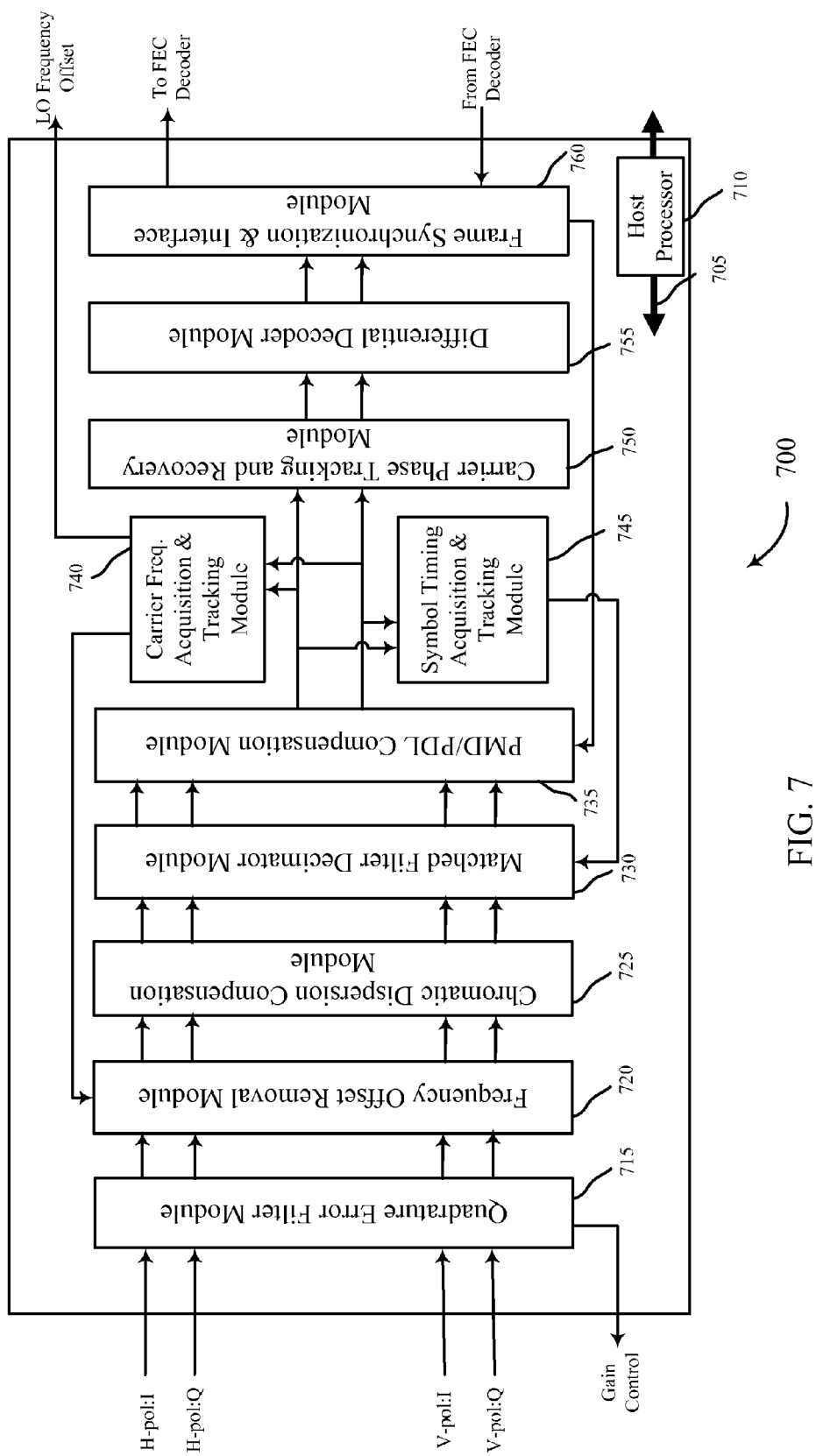
FIG. 7 is a block diagram of a digital demodulation unit according to various embodiments of the invention.

Referring now to FIG. 7, a demodulator unit 700 is described. This may be the digital demodulator unit 615 of FIG. 6. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 800 processes the digitized samples of the I and Q components of the two polarization components to recover the transmitted data. At the input, the demodulator unit 700 accepts the four parallel streams carrying HI, HQ, VI and VQ samples. In one embodiment, each stream contains multiple samples per clock. At its output the demodulator may provide demodulated hard-decision data (although in other examples, soft-decision data may be provided) to the FEC decoder module. The demodulator unit 700 may identify the beginning of a FEC frame. Additionally, in some embodiments the demodulator unit 700 receives feedback signals from the FEC decoder module 620 regarding the convergence status for error correction. Furthermore, in some embodiments the demodulator unit 700 receives information from unique word identification module 610 to assist in the demodulation.

In some embodiments, the demodulator unit 700 is implemented as an application specific integrated circuit (ASIC) that includes a number of functional modules. In such embodiments, the demodulator unit 700 may have a control and monitor interface bus 705 connected to a host processor 710 allowing for configuration of demodulator parameters (filter coefficients, loop gains, etc.) and extraction of demodulator status. With continuing reference to FIG. 7, several of the sub-modules within the demodulator unit 700 of various embodiments are described. In this embodiment, a quadrature error filter (QEF) module 715 provides a collection of data formatting, error detection and correction functions. In one embodiment, input data samples are expected to be in binary-offset/offset-binary format and are converted to a two's complement (2C) format for processing within a digital signal processor.

The incoming HI, HQ, VI and VQ streams, in some embodiments, also can be independently swapped and inverted if needed, allowing for any design issues that might translate into an accidental inversion or IQ swap. Each data stream of these various embodiments may be processed to remove polarization skew (between H and V poles) as well as I-Q skew within a pole. The QEF module 715 may provide for detection and removal of four types of quadrature signal errors: I/Q Skew, DC bias, I/Q amplitude imbalance, and I/Q phase imbalance. All four error detectors may be independently enabled or disabled, in some embodiments, via the processor interface, and the detected error values are output as status values via this same interface. The QEF module 715 may also output a gain control signal that may be used by other components of the system.

The QEF module 715 is connected with a frequency offset removal module 720. The frequency offset removal module 720 in one example performs a frequency rotation on the data samples coming out of the QEF module 715. The amount of frequency rotation is controlled by a frequency error input that is sourced by a carrier frequency acquisition and tracking (CFAT) module 740. Such frequency offset removal function may remove residual frequency left from the LO laser tuning in the optical domain. A chromatic dispersion compensation module 725 removes bulk chromatic dispersion from the horizontal and vertical polarization channels. The compensation may be applied via a filter in the frequency domain. The amount of correction may be controlled by the chromatic dispersion filter inputs that are derived outside of the demodulator module 700 and provided via the host processor 710 and control and monitor interface bus 705, in this embodiment.

A matched filter decimator (MFD) module 730 may implement an interpolation function that provides decimation on samples taken at two+$\epsilon$ times the symbol rate. In one embodiment, each of the four data streams has an independent bank of FIR filters with selected coefficients. The incoming data is processed through the filter banks to produce two samples per symbol for each data stream. Data samples are gathered and assembled into blocks of fixed numbers of samples per stream per clock by a sample block assembler. The assembly function may be identical for the I and Q streams in each polarization so one assembly block may service two streams. A PMD/PDL compensation module 735 may utilize adaptive equalization to compensate for cross-polarization interference, IQ channel interference, and adjacent symbol interference introduced by PMD and PDL in the optical channel and other residual impairments, such as residual chromatic dispersion as mentioned above. In one embodiment, an adaptive equalizer takes in data at one or two samples/symbols from the MFD module 730 and processes the data through a bank of FIR filters with adaptive filter tap coefficients.

In some embodiments, a symbol timing acquisition and tracking (STAT) module 745 may estimate symbol timing using an early/late symbol radius matching scheme and PI controller, and generate an error signal to correct symbol timing. This STAT module 745, in an embodiment, also has a symbol timing lock detection mechanism that outputs a symbol lock indicator. In various embodiments, there are two sets of gains for the PI controller (wide band for acquisition and narrow band for tracking) When not in timing lock, the wideband gains may be used, otherwise, the narrowband gains may be used. The STAT module 745 may perform symbol timing acquisition and tracking of a portion of the optical signal after the PMD/PDL compensation module compensates for interference caused by PMD and PDL and before carrier phase recovery on the portion of the optical signal.

The CFAT module 740 may be responsible for acquiring, as well as tracking, carrier frequency. Carrier frequency acquisition is achieved using one of a number of techniques, such as through fast Fourier transform (FFT) with appropriate averaging and peak frequency component detection. The CFAT module 740 may provide a frequency error input to the frequency offset removal module 720. The CFAT module 740, in some embodiments, also provides a control output for the local oscillator (LO) frequency offset output, that may be used with data from the frame synchronization and interface module 760. A carrier phase tracking and recovery module 750 may use a feed-forward algorithm with a block phase estimator and a phase rotation function to remove residual frequency and phase errors. The carrier phase tracking and recovery module 750 may operate on the on-time data samples produced by the PMD compensation module. A differential decoder 755 may be responsible, in various embodiments, for accepting symbol streams from the carrier phase tracking and recovery module 750 (e.g., at 1 sample per symbol). The differential decoder 755 may be configured to differentially decode the signal and provide the decoded output (e.g., a hard-decision output data stream) to the frame synchronization and interface module 760. The frame synchronization and interface module 760 processes data to achieve frame synchronization, and may include functional blocks for data alignment, frame sync detection, and clock transfer. The frame synchronization module 760 may be configured to skew, swap, and rotate received channels with respect to each other. In some embodiments the frame synchronization module 760 receives information from unique word identification module 610 to assist in data alignment, frame sync detection, and/or clock transfer.

Figure 8:
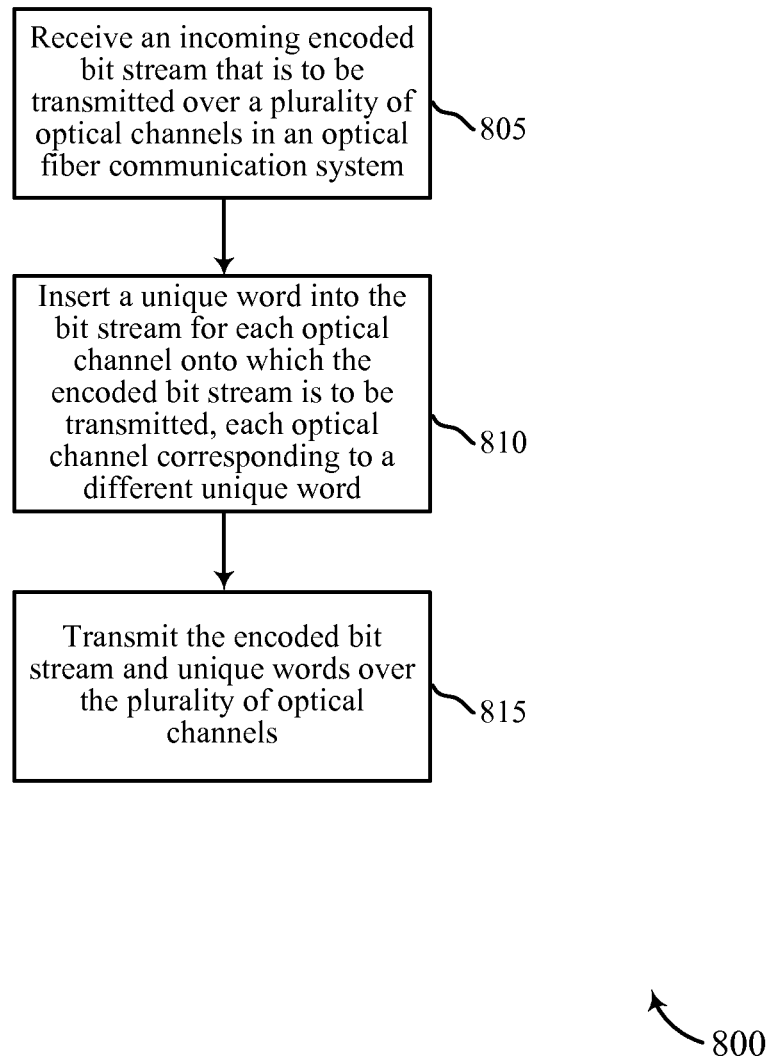
FIG. 8 is a flow chart of a method for inserting a unique word into optical streams to be transmitted over optical fibers according to various embodiments of the invention.

FIG. 8 is a flow chart of a method 800 for digital modulation and encoding of an optical signal according to various embodiments of the invention. The method 800 may be performed by the digital modulation and encoding unit 105 of FIGS. 1 through 3.

At block 805, an incoming encoded bit stream is received that is to be transmitted over a plurality of optical channels in an optical fiber communication system. Incoming data may be generated from a data source that provides data to a digital coding and modulation unit, such as unit 105 of FIG. 1. The data source may include any of a number of common data sources, such as a user telecommunications device, a cable operator head-end unit, a telecommunications provider central office, a computer server, or a network attached storage system, to name but a few examples. At block 810, a unique word is inserted into the bit stream for each optical channel onto which the encoded bit stream is to be transmitted, each optical channel corresponding to a different unique word. Such unique words may assist with the decoding and demodulation of the optical signals containing different streams of data. At block 815, the encoded bit stream and unique words are transmitted over the plurality of optical channels. Transmission may be performed in the optical domain via dual-pole QPSK modulation, resulting in four parallel optical streams. Other modulation schemes may be used in other examples, as well.

Figure 9:
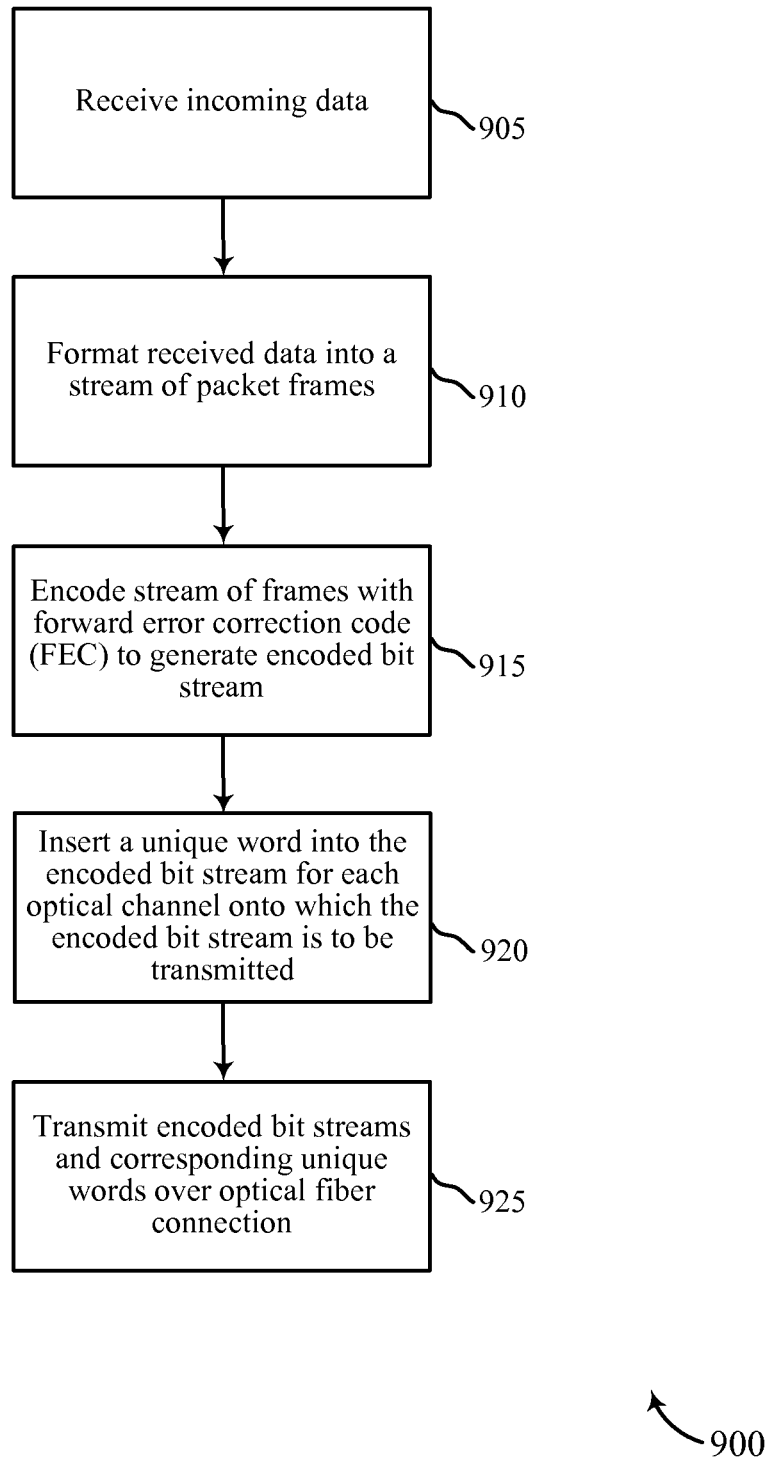
FIG. 9 is a flow chart of a method for inserting a unique word into optical streams to be transmitted over optical fibers according to other embodiments of the invention.

FIG. 9 is a flow chart of a method 900 for digital modulation and encoding of an optical signal according to various embodiments of the invention. The method 900 may be performed by the digital modulation and encoding unit 105 of FIGS. 1 through 3.

At block 905, incoming data is received. Incoming data may be generated from a data source that provides data to a digital coding and modulation unit, such as unit 105 of FIG. 1. The data source may include any of a number of common data sources, such as a user telecommunications device, a cable operator head-end unit, a telecommunications provider central office, a computer server, or a network attached storage system, to name but a few examples. At block 910, the received data is formatted into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. At block 915, the stream of packet frames is encoded with forward error correction code (FEC) to generate an encoded but stream. The particular type of FEC information of various embodiments generally includes systematically generated redundant error-correcting code (ECC) data that is transmitted along with the frames, and in an embodiment FEC information includes turbo product code (TPC) information. The FEC information may be interleaved with the frames of data to reduce the likelihood of a channel error removing all FEC data for a particular frame.

At block 920, a unique word is inserted into the encoded bit stream for each transmitted optical channel. Such unique words may assist with the decoding and demodulation of the optical signals containing different streams of data. In one embodiment, the interleaved frames of data are modulated using dual-polarity (dual-pole) quadrature-phase-shift-keying (QPSK), resulting in four optical channels, with a unique word inserted into the data stream for each of the four optical channels. Differential encoding may be applied to the bit stream either before or after the addition of the unique words. The encoded data streams and unique words transmitted over an optical fiber connection, as indicated at block 925. Transmission may be performed in the optical domain via dual-pole QPSK modulation, resulting in four parallel optical streams. Other modulation schemes may be used in other examples, as well.

Figure 10:
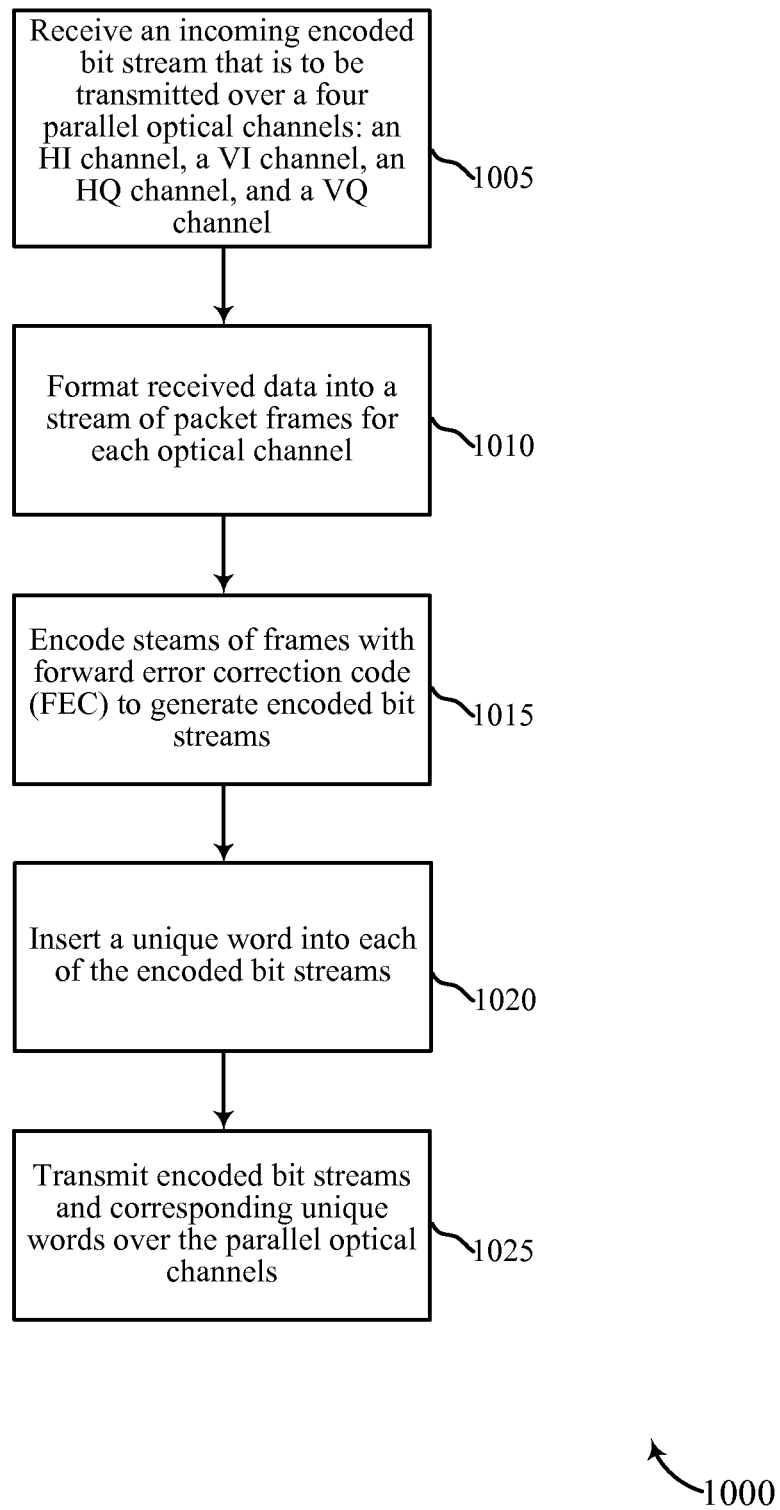
FIG. 10 is a flow chart of a method for inserting unique words into optical streams to be transmitted over optical fibers according to various embodiments of the invention.

FIG. 10 is a flow chart of a method 1000 for digital modulation and encoding of an optical signal according to various embodiments of the invention. The method 1000 may be performed by the digital modulation and encoding unit 105 of FIGS. 1 through 3.

Initially, at block 1005, an incoming encoded bit stream is received that is to be transmitted over a four parallel optical channels: an HI channel, a VI channel, an HQ channel, and a VQ channel. Incoming data may be generated from a data source that provides data to a digital coding and modulation unit, such as unit 105 of FIG. 1. The data source may include any of a number of common data sources, such as a user telecommunications device, a cable operator head-end unit, a telecommunications provider central office, a computer server, or a network attached storage system, to name but a few examples. At block 1010, received data is formatted into a stream of packet frames for each optical channel. At block 1015, steams of frames are encoded with forward error correction code (FEC) to generate encoded bit streams. A unique word is inserted into each of the encoded bit streams, as indicated at block 1020. Such unique words, similarly as described above, may assist with the decoding and demodulation of the optical signals containing different streams of data. The encoded bit streams and corresponding unique words are transmitted, at block 1025, over the parallel optical channels. Transmission may be performed in the optical domain via dual-pole QPSK modulation, resulting in four parallel optical streams. Other modulation schemes may be used in other examples, as well.

Figure 11:
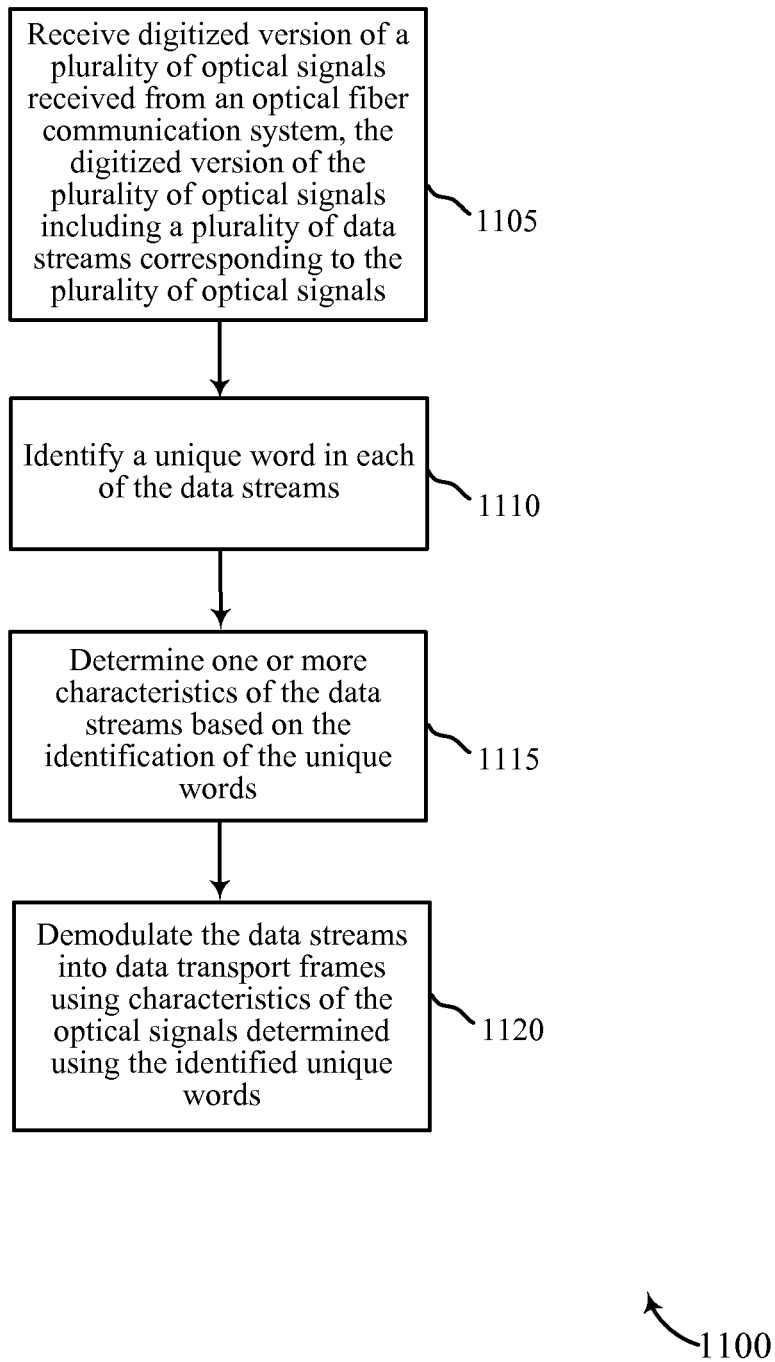
FIG. 11 is a flow chart of a method for digital demodulation of optical signals based on signal characteristics determined from identification of unique words present on a plurality of optical channels according to various embodiments of the invention.

FIG. 11 is a flow chart of a method for digital demodulation of an optical signal according to various embodiments of the invention. The method 1100 may be performed by the digital demodulation and decoding unit 125 of FIG. 1 or 6. More specifically, the method 1100 may be performed by the demodulator unit 615, or 700 of FIG. 6 or 7, respectively.

At block 1105, a digitized version of a plurality of optical signals is received from an optical fiber communication system, the digitized version of the plurality of optical signals including a plurality of data streams corresponding to the plurality of optical signals. At block 1110, a unique word in each of the data streams is identified. At block 1115, one or more characteristics of the data streams are determined based on the identification of the unique words. Such characteristics may include, for example, the particular received channel on which the unique words are identified, and the timing of the receipt of the unique words. At block 1120, the data streams are demodulated into data transport frames using characteristics of the optical signals determined using the identified unique words. In various embodiments, one or more modules within a demodulator and decoder may receive one or more measured characteristics of the parallel data streams that were determined based on the identification of the unique words, which may be used to assist in the demodulating and/or decoding of the received optical channels.

Figure 12:
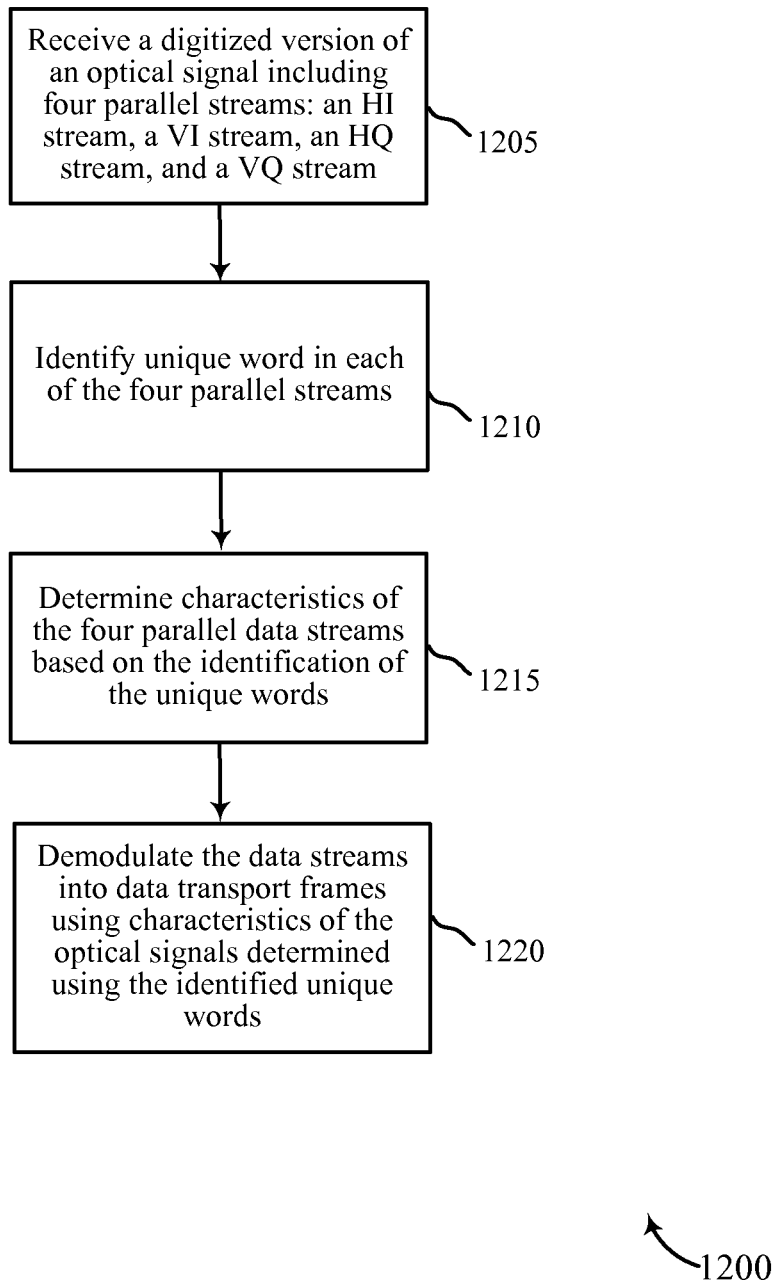
FIG. 12 is a flow chart of another method for digital demodulation of optical signals based on signal characteristics determined from identification of unique words present on a plurality of optical channels according to various embodiments of the invention.

FIG. 12 is a flow chart of a method for digital demodulation of an optical signal according to various embodiments of the invention. The method 1200 may be performed by the digital demodulation and decoding unit 125 of FIG. 1 or 6. More specifically, the method 1200 may be performed by the demodulator unit 615, or 700 of FIG. 6 or 7, respectively.

At block 1205, a digitized version of an optical signal is received, including four parallel streams: a horizontal in-phase (HI) stream, a vertical in-phase stream (VI), a horizontal quadrature (HQ) stream, and a vertical quadrature (VQ) stream. At block 1210, a unique word in each of the four parallel streams is identified. At block 1215, characteristics of the parallel data streams are determined based on the identification of the unique words. Such characteristics may include, for example, the particular received channel on which the unique words are identified, and the timing of the receipt of the unique words. At block 1220, the data streams are demodulated into data transport frames using, in part, characteristics of the optical signals determined using the identified unique words. In various embodiments, one or more modules within a demodulator and decoder may receive one or more measured characteristics of the parallel data streams that were determined based on the identification of the unique words, which may be used to assist in the demodulating and/or decoding of the received optical channels.

Figure 13:
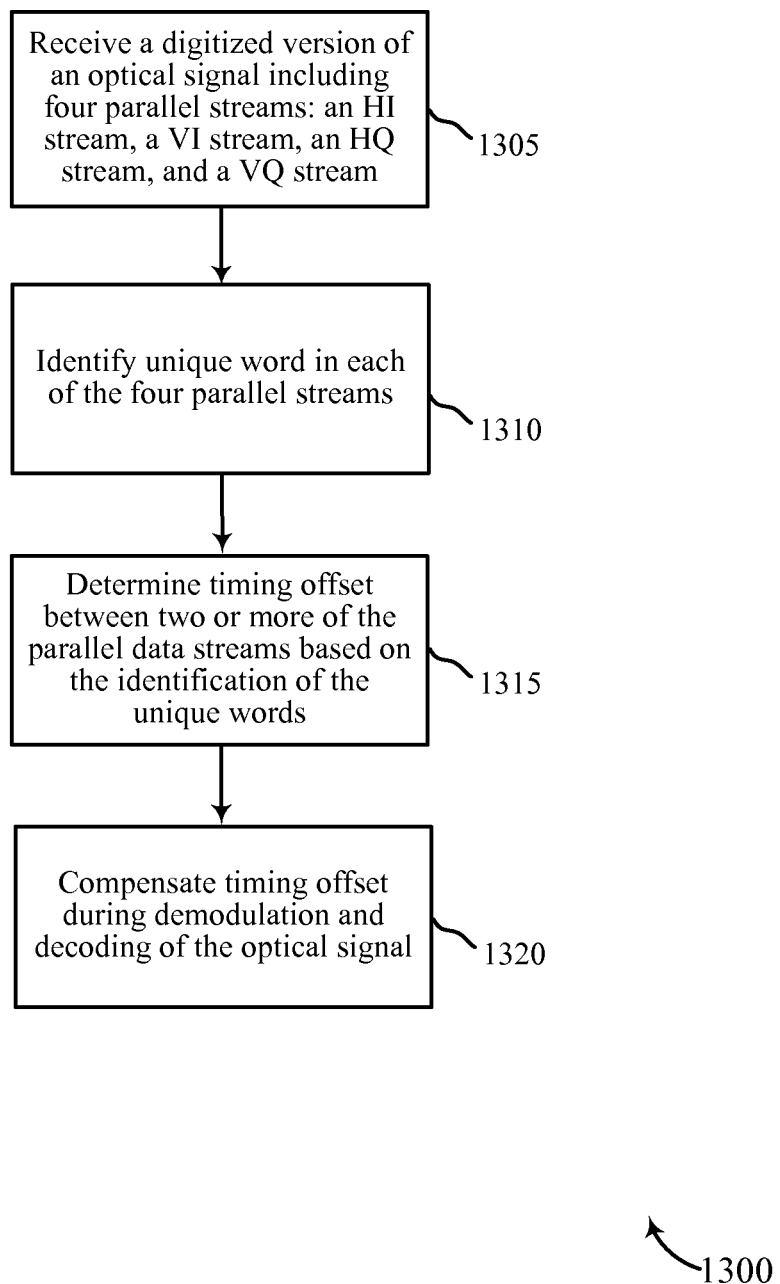
FIG. 13 is a flow chart of a method for timing offset detection and compensation based on signal characteristics determined from identification of unique words present on a plurality of optical channels according to various embodiments of the invention.

FIG. 13 is a flow chart of a method for digital demodulation of an optical signal according to various embodiments of the invention. The method 1300 may be performed by the digital demodulation and decoding unit 125 of FIG. 1 or 6. More specifically, the method 1300 may be performed by the demodulator unit 615, or 700 of FIG. 6 or 7, respectively.

Initially, at block 1305, a digitized version of an optical signal is received, including four parallel streams: a horizontal in-phase (HI) stream, a vertical in-phase stream (VI), a horizontal quadrature (HQ) stream, and a vertical quadrature (VQ) stream. At block 1310, a unique word in each of the four parallel streams is identified. At block 1315, timing offset between two or more of the parallel data streams is determined based on the identification of the unique words. Timing offset may be determined by comparing the time of receipt of the unique words associated with the data streams. For example, data streams may be demodulated and decoded at a particular symbol rate, and the difference in the number of symbols between receipt of unique words in channels that were simultaneously transmitted may be used to determine timing offset. At block 1320, timing offset is compensated during demodulation and decoding of the optical signal. For example, the amount of timing offset may be provided to one or more compensation modules, such as PMD/PDL compensation module 735 of FIG. 7, which may at least partially compensate for the timing offset through adjustment of filters contained in the module. In various embodiments, one or more other modules within a demodulator and decoder may receive timing offset information that was determined based on the identification of the unique words, which may be used to assist in the demodulating and/or decoding of the received optical channels.

Figure 14:
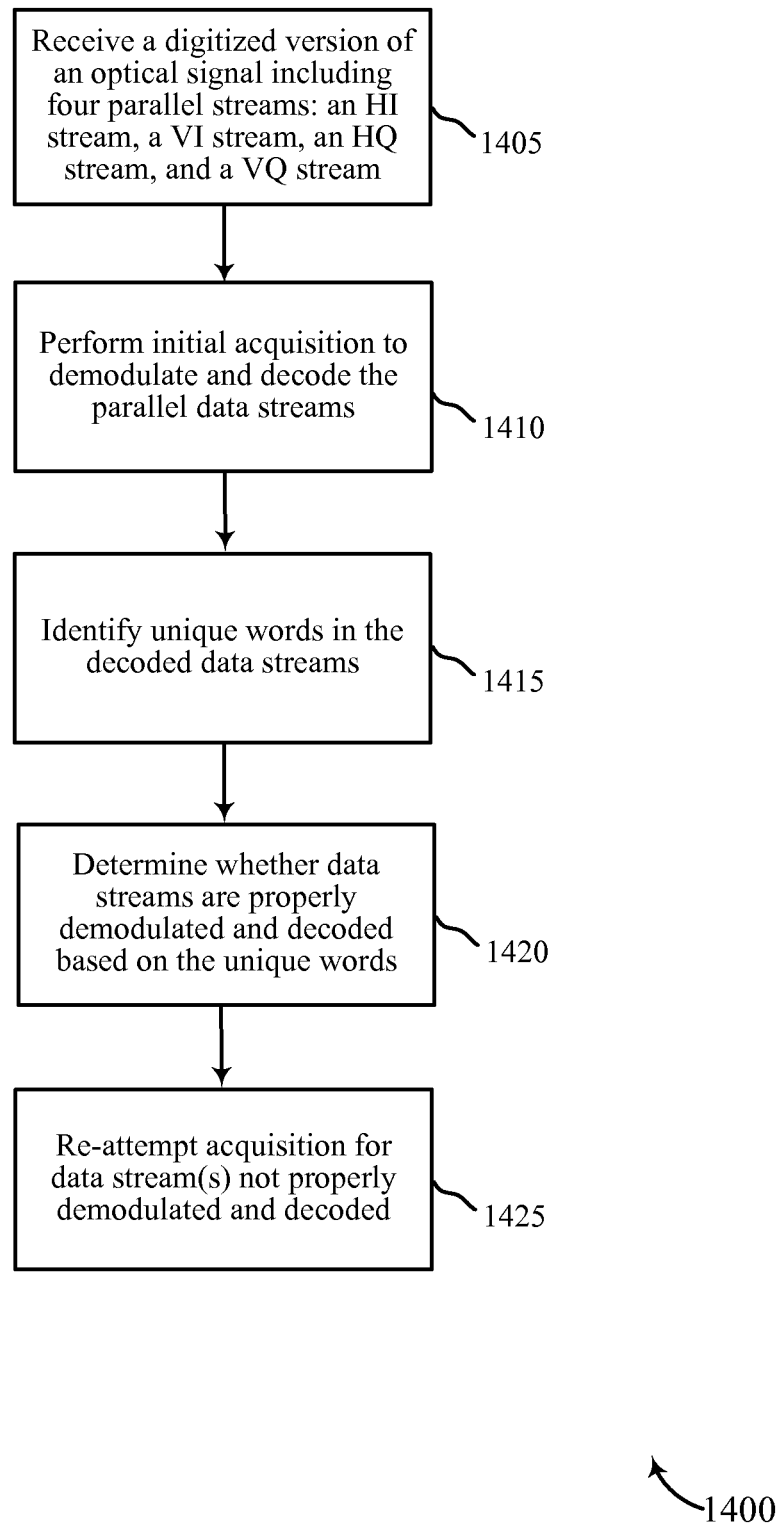
FIG. 14 is a flow chart of a method for verifying proper signals are demodulated and decoded based on signal characteristics determined from identification of unique words present on a plurality of optical channels according to various embodiments of the invention.

FIG. 14 is a flow chart of another method for digital demodulation of an optical signal according to various embodiments of the invention. The method 1400 may be performed by the digital demodulation and decoding unit 125 of FIG. 1 or 6. More specifically, the method 1400 may be performed by the demodulator unit 615, or 700 of FIG. 6 or 7, respectively.

At block 1405, a digitized version of an optical signal is received, including four parallel streams: a horizontal in-phase (HI) stream, a vertical in-phase stream (VI), a horizontal quadrature (HQ) stream, and a vertical quadrature (VQ) stream. At block 1410, initial acquisition is performed to demodulate and decode the parallel data streams. At block 1415, a unique word in each of the decoded data streams is identified. At block 1420, it is determined if data streams are properly demodulated and decoded based on the unique words. For example, if two output data streams contain the same unique word, it may be determined that one or more of the modules of the demodulator has locked onto an incorrect data stream. Such a situation may occur, for example, if the channel conditions in the optical fiber transport connection result in each of the horizontal and vertical polarities of the transmitted optical signal being rotated by about 45 degrees. In such a situation, portions of the demodulator modules configured to demodulate the different polarity signals may each lock on to the same polarity signal. In such a situation, the unique word will be the same for both data streams, indicating that one of the data streams is not valid. At block 1425, acquisition is re-attempted for any data stream(s) that are not properly demodulated and decoded. In such a manner, proper demodulation and decoding of the data streams may be verified and corrected.

The digital demodulation and decoding unit 125 of FIG. 1 or 6. More specifically, the method 1300 may be performed by the demodulator unit 615, or 700 of FIG. 6 or 7, respectively The components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A digital coding and modulation apparatus, comprising:
a data transport layer framer module configured to:
receive an incoming data stream; and
format the data stream into data transport frames;
a coding module coupled with the data transport layer framer module and configured to encode error correction information into the data transport frames;
a unique word insertion module coupled with the coding module and configured to insert a plurality of unique words into a data stream including the data transport frames, each of the plurality of unique words corresponding to a different optical communication channel; and
an optical transmission module coupled with the unique word insertion module and configured to modulate the data transport frames and unique words onto a plurality of optical communications channels and transmit the plurality of optical communications channels over an optical fiber, each of the plurality of unique words being modulated onto an associated optical communications channel.

2. The apparatus of claim 1, further comprising a differential encoding module coupled between the unique word insertion module and the optical transmission module and configured to differentially encode data transport frames and unique words.

3. The apparatus of claim 1, further comprising a differential encoding module coupled between the coding module and unique word insertion module and configured to differentially encode data transport frames.

4. The apparatus of claim 1, wherein the optical transmission module is configured to transmit dual-polarity QPSK optical signals over an optical fiber.

5. The apparatus of claim 4, wherein,
the plurality of optical communications channels comprise a horizontal in-phase (HI) channel, a vertical in-phase (VI) channel, a horizontal quadrature (HQ) channel, and a vertical quadrature (VQ) channel; and
a first unique word of the plurality of unique words corresponds to the HI channel, a second unique word of the plurality of unique words corresponds to the VI channel, a third unique word of the plurality of unique words corresponds to the HQ channel, and a fourth unique word of the plurality of unique words corresponds to the VQ channel.

6. The apparatus of claim 1, wherein the unique word insertion module inserts data bits corresponding to the unique words into the data stream based on a modulation scheme of the optical transmission module.

7. The apparatus of claim 1, wherein each unique word comprises a PN code that corresponds to the optical communications channel associated with the unique word.

8. A digital decoding and demodulation apparatus, comprising:
an optical interface module configured to receive a plurality of optical signals on a plurality of optical channels from an optical fiber and output a digitized version of each optical signal;
a unique word identification module coupled with the optical interface module and configured to identify a unique word in each of the plurality of optical signals; and
a demodulator module coupled with the unique word module and configured to:
receive the digitized version of the optical signals; and
demodulate the optical signals into data transport frames using characteristics of the optical signals determined using the identified unique words, the one or more characteristics comprising an identification of one or more of the plurality of data streams and timing information between one or more of the plurality of data streams.

9. The apparatus of claim 8, further comprising:
a decoder module coupled with the demodulator module and configured to perform error correction on the data transport frames; and
a data transport layer de-framer module coupled with the decoder module and configured to receive error corrected data transport frames and output a de-framed data stream.

10. The apparatus of claim 8, wherein the demodulator module comprises a differential decoding module configured to differentially decode data transport frames and unique words.

11. The apparatus of claim 8, further comprising a differential decoding module coupled between the optical interface module and the unique word identification module and configured to differentially decode the digitized version of each optical signal.

12. The apparatus of claim 8, wherein the optical interface module is configured to receive dual-polarity QPSK optical signals over an optical fiber.

13. The apparatus of claim 12, wherein the unique word identification identifies unique words in each of a horizontal in-phase (HI), vertical in-phase (VI), horizontal quadrature (HQ) and vertical quadrature (VQ) channel.

14. The apparatus of claim 13, wherein the demodulator module uses at least a phase offset determined based on the timing information to track and correct phase for each of the HI, VI, HQ, and VQ channels.

15. The apparatus of claim 8, wherein the unique word in each of the plurality of optical signals comprises a PN code that corresponds to the associated optical signal.

16. A method comprising:
receiving an incoming encoded bit stream that is to be transmitted over a plurality of optical channels in an optical fiber communication system;
differentially encoding the encoded bit stream;
inserting a unique word into the bit stream for each optical channel onto which the encoded bit stream is to be transmitted, each optical channel corresponding to a different unique word; and
transmitting the encoded bit stream and unique words over the plurality of optical channels.

17. The method of claim 16, wherein,
the plurality of optical communications channels comprise a horizontal in-phase (HI) channel, a vertical in-phase (VI) channel, a horizontal quadrature (HQ) channel, and a vertical quadrature (VQ) channel; and
a first unique word of the plurality of unique words corresponds to the HI channel, a second unique word of the plurality of unique words corresponds to the VI channel, a third unique word of the plurality of unique words corresponds to the HQ channel, and a fourth unique word of the plurality of unique words corresponds to the VQ channel.

18. The method of claim 16, wherein inserting a unique word comprises inserting data bits corresponding to the unique words into the encoded bit stream based on a modulation scheme used for the transmitting of the encoded bit stream.

19. The method of claim 16, wherein the unique word for each optical channel comprises a PN code that corresponds to the optical channel.

20. A method comprising:
receiving a digitized version of a plurality of optical signals received from an optical fiber communication system, the digitized version of the plurality of optical signals including a plurality of data streams corresponding to the plurality of optical signals;
identifying a unique word in each of the data streams;
determining one or more characteristics of the data streams based on the identification of the unique words, the one or more characteristics comprising an identification of one or more of the plurality of data streams and timing information between one or more of the plurality of data streams; and
demodulating the data streams into data transport frames using characteristics of the optical signals determined using the identified unique words.

21. The method of claim 20, further comprising differentially decoding the encoded bit stream.

22. The method of claim 20, wherein receiving a digitized version of a plurality of optical signals comprises receiving dual-polarity QPSK optical signals over an optical fiber.

23. The method of claim 20, wherein the plurality of data streams comprise: horizontal in-phase (HI) stream, a vertical in-phase (VI) stream, a horizontal quadrature (HQ) stream, and a vertical quadrature (VQ) stream.

24. The method of claim 20, wherein the unique word for each data stream comprises a PN code that corresponds to the data stream.

25. A method comprising:
receiving an incoming encoded bit stream that is to be transmitted over a plurality of optical channels in an optical fiber communication system;
inserting a unique word into the bit stream for each optical channel onto which the encoded bit stream is to be transmitted, each optical channel corresponding to a different unique word; and
transmitting the encoded bit stream and unique words over the plurality of optical channels,
wherein transmitting the encoded bit stream comprises transmitting dual-polarity QPSK optical signals over an optical fiber.

* * * * *